(12) United States Patent
Takabatake et al.

(10) Patent No.: US 11,801,853 B2
(45) Date of Patent: Oct. 31, 2023

(54) ONBOARD DISPLAY CONTROL DEVICE, ONBOARD DISPLAY DEVICE, DISPLAY CONTROL METHOD, AND DISPLAY CONTROL PROGRAM

(71) Applicant: TOYOTA JIDOSHA KABUSHIKI KAISHA, Toyota (JP)

(72) Inventors: Satoaki Takabatake, Nissin (JP); Junji Miyazaki, Nagoya (JP); Koji Kimura, Nagoya (JP); Yuki Yoshida, Toyota (JP); Ryo Ogata, Toyota (JP); Tadashi Morishita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

(21) Appl. No.: 17/394,746

(22) Filed: Aug. 5, 2021

(65) Prior Publication Data
US 2022/0063650 A1 Mar. 3, 2022

(30) Foreign Application Priority Data
Aug. 31, 2020 (JP) .................. 2020-146392

(51) Int. Cl.
*B60W 50/14* (2020.01)
*B60W 60/00* (2020.01)
(Continued)

(52) U.S. Cl.
CPC ............ *B60W 50/14* (2013.01); *B60W 10/18* (2013.01); *B60W 10/20* (2013.01);
(Continued)

(58) Field of Classification Search
CPC ...... B60W 50/14; B60W 10/18; B60W 10/20; B60W 60/0053; B60W 60/0061; B60W 2050/146; B60W 2420/42; B60W 60/001; B60W 30/18163; G02B 27/0101; G02B 2027/014; G02B 2027/0141; G06V 20/588; G09G 3/002; G09G 2380/10;
(Continued)

(56) References Cited

U.S. PATENT DOCUMENTS 10,642,266 B2 5/2020 Tsai et al.
10,807,608 B2 * 10/2020 Nishiguchi ........... B60W 30/12
(Continued)

FOREIGN PATENT DOCUMENTS

| JP | 2017-032441 A | 2/2017 |
| JP | 2020-091778 A | 6/2020 |
| WO | 2018/087883 A1 | 5/2018 |

*Primary Examiner* — Christopher E Leiby
(74) *Attorney, Agent, or Firm* — Oliff PLC

(57) ABSTRACT

An onboard display device is installed in a vehicle configured to enable autonomous driving. The onboard display device includes an information acquisition section and a display control section. In a case in which the vehicle attempts to merge from a traveling lane into a merging destination lane during autonomous driving, the information acquisition section acquires information regarding a point at which the attempt will be aborted, before the vehicle arrives at the point. The display control section displays the information regarding the point that is acquired by the information acquisition section, before the arrival at the point. at a display portion that is provided within a vehicle cabin of the vehicle.

15 Claims, 15 Drawing Sheets

(51) Int. Cl.
*G06V 20/56* (2022.01)
*B60W 10/18* (2012.01)
*B60W 10/20* (2006.01)
*G02B 27/01* (2006.01)
*G09G 3/00* (2006.01)

(52) U.S. Cl.
CPC .... *B60W 60/0053* (2020.02); *B60W 60/0061* (2020.02); *G02B 27/0101* (2013.01); *G06V 20/588* (2022.01); *G09G 3/002* (2013.01); *B60W 2050/146* (2013.01); *B60W 2420/42* (2013.01); *G02B 2027/014* (2013.01); *G02B 2027/0141* (2013.01); *G09G 2380/10* (2013.01)

(58) Field of Classification Search
CPC .. G08G 1/167; B60K 2370/166; B60K 35/00; B60K 2370/152; B60K 2370/167; B60K 2370/172; B60K 2370/175; B60K 2370/178; B60K 2370/179; B60K 2370/1868; B60K 2370/197
See application file for complete search history.

(56) References Cited

U.S. PATENT DOCUMENTS

| | | | |
|---|---|---|---|
| 2005/0015203 A1 | 1/2005 | Nishira | |
| 2016/0214612 A1* | 7/2016 | Kashiba | B60W 10/184 |
| 2016/0304126 A1* | 10/2016 | Yamaoka | B60K 35/00 |
| 2017/0088144 A1 | 3/2017 | Shibata | |
| 2017/0151910 A1* | 6/2017 | Sato | G06F 3/14 |
| 2017/0334460 A1* | 11/2017 | Arakawa | B60W 30/18163 |
| 2018/0251155 A1* | 9/2018 | Chan | B62D 15/029 |
| 2019/0047561 A1* | 2/2019 | Nishiguchi | B60W 50/14 |
| 2019/0271985 A1 | 9/2019 | Mimura et al. | |
| 2020/0079393 A1* | 3/2020 | Hasegawa | B60W 10/20 |
| 2020/0166930 A1 | 5/2020 | O'Dea et al. | |
| 2020/0172122 A1* | 6/2020 | Mimura | B60K 35/00 |
| 2020/0180642 A1 | 6/2020 | Takashiro | |
| 2020/0231158 A1* | 7/2020 | Okuyama | B60W 30/18163 |
| 2021/0107510 A1* | 4/2021 | Kato | B60W 30/18163 |
| 2022/0001888 A1* | 1/2022 | Hashimoto | B60W 60/0057 |
| 2022/0212689 A1* | 7/2022 | Nakao | G08G 1/0962 |
| 2022/0289228 A1* | 9/2022 | Yamamoto | B60K 35/00 |
| 2022/0340166 A1* | 10/2022 | Kume | G06F 3/1423 |
| 2023/0013492 A1* | 1/2023 | Kume | B60K 35/00 |

* cited by examiner

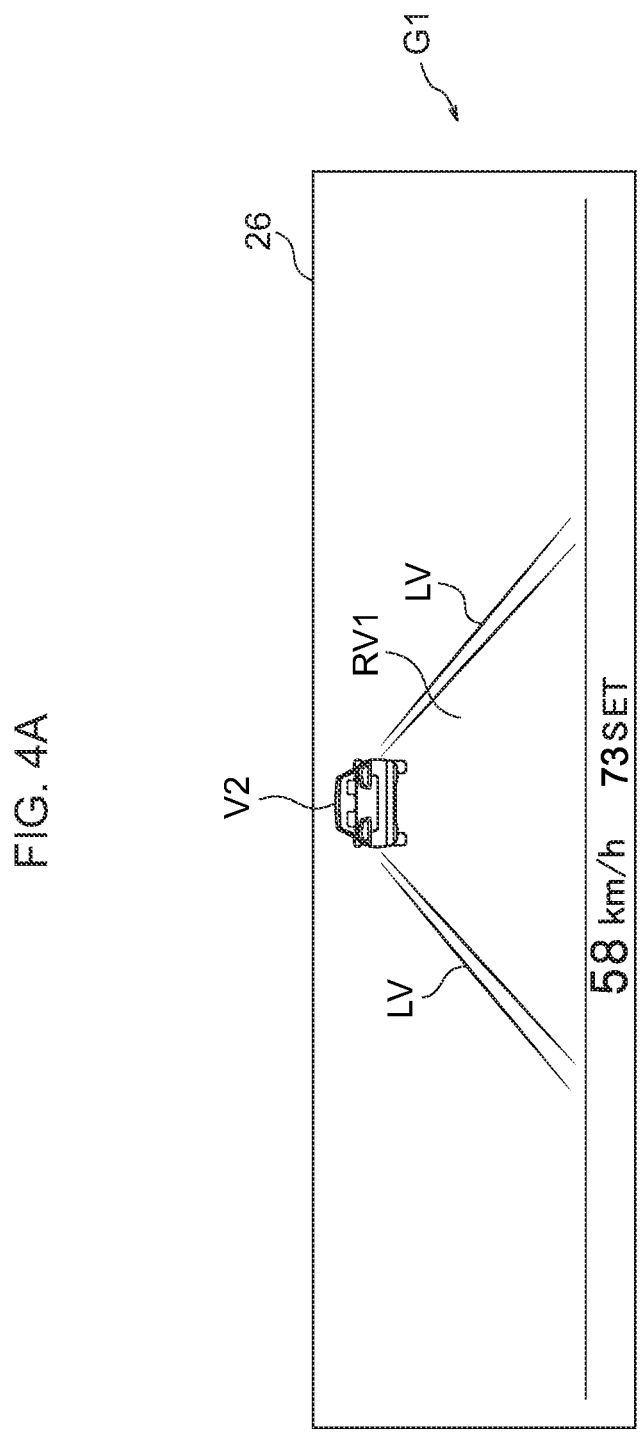

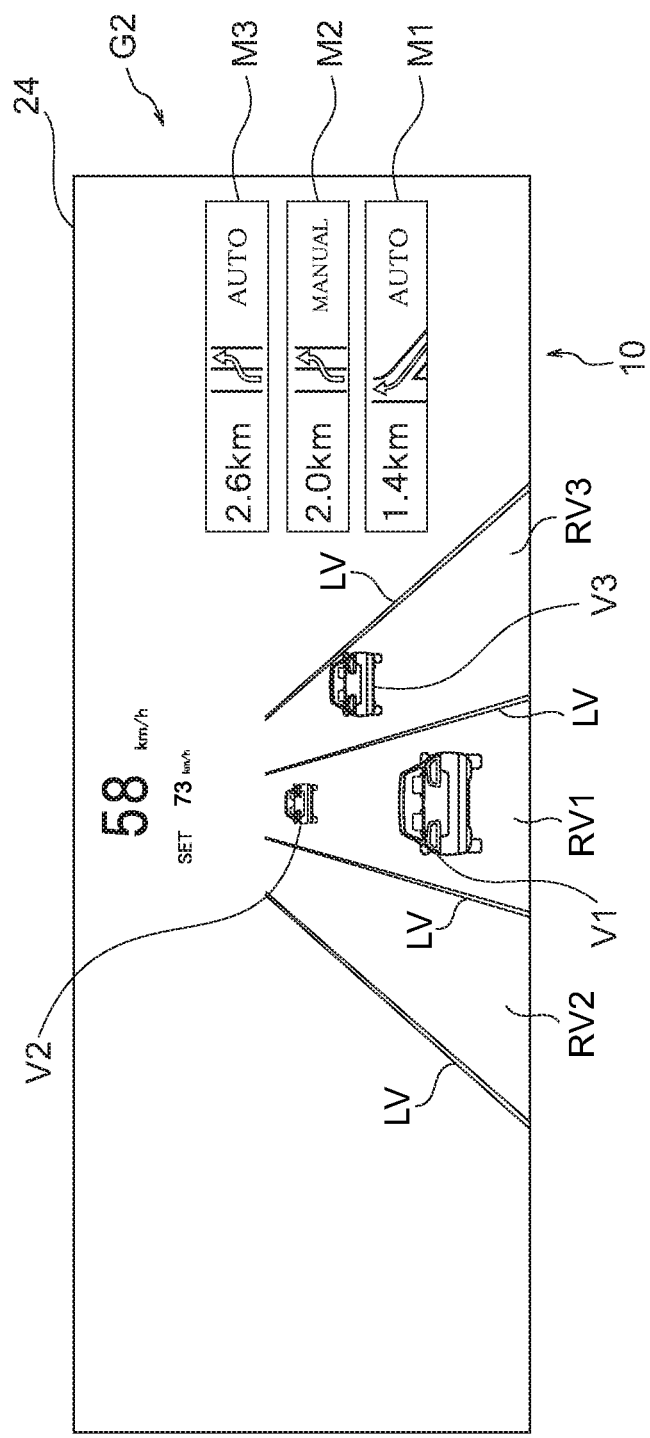

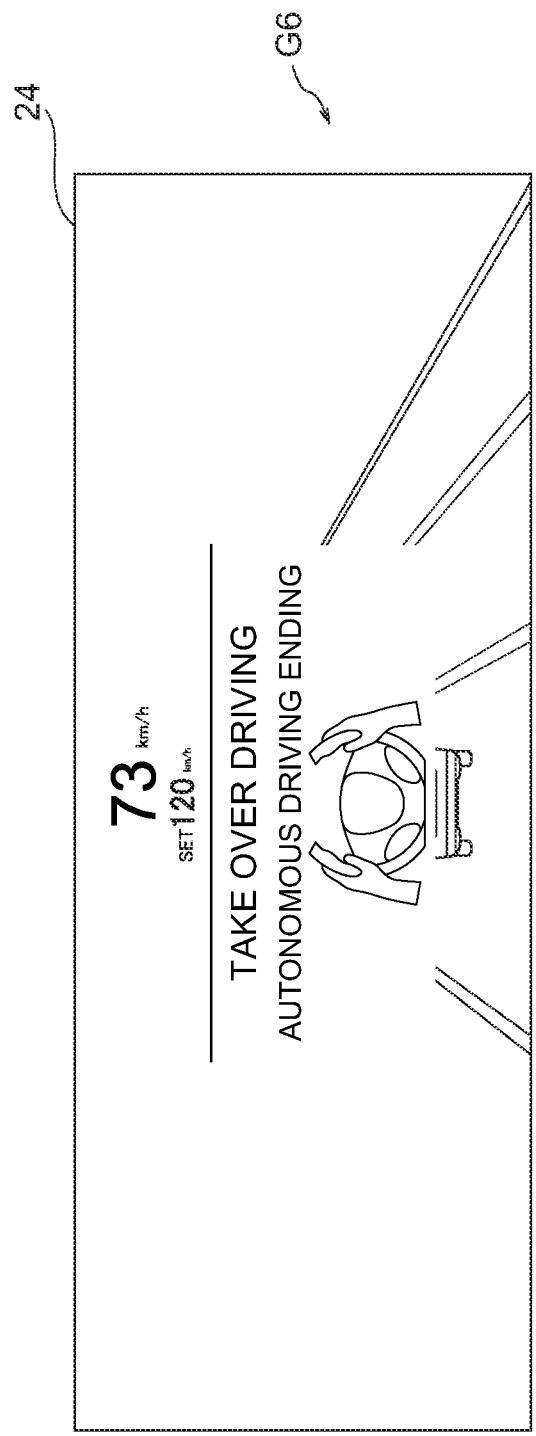

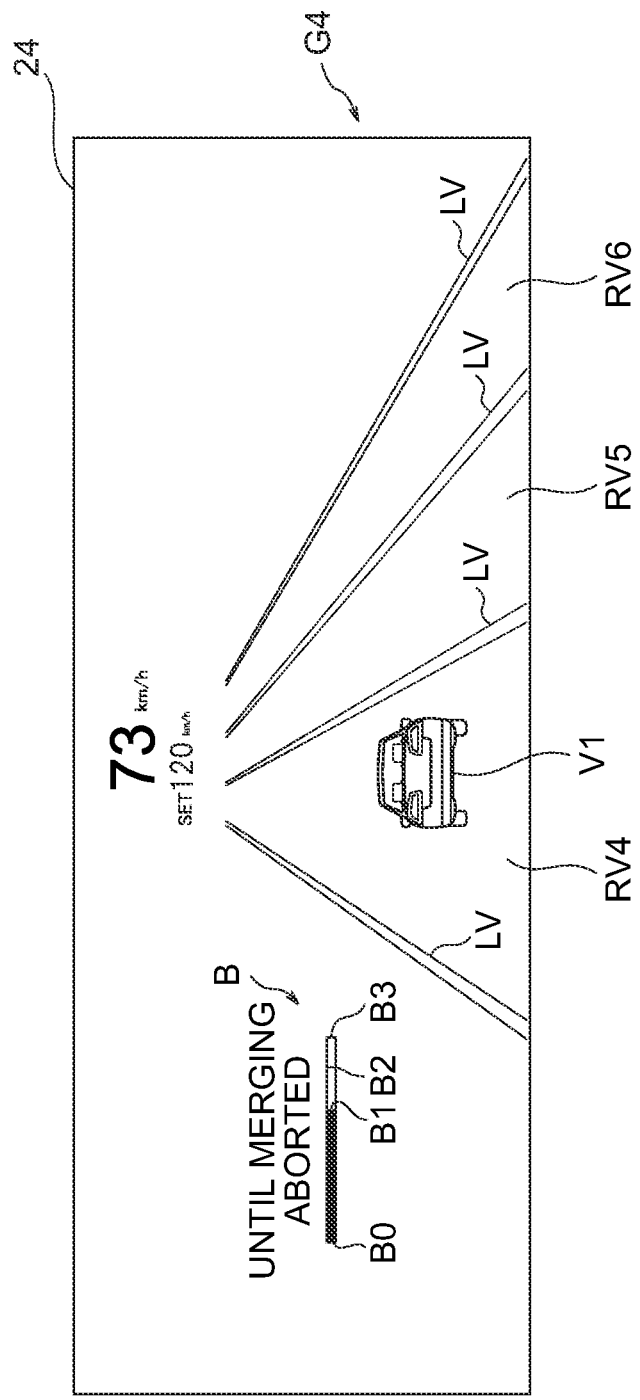

ONBOARD DISPLAY CONTROL DEVICE, ONBOARD DISPLAY DEVICE, DISPLAY CONTROL METHOD, AND DISPLAY CONTROL PROGRAM

CROSS-REFERENCE TO RELATED APPLICATION

This application is based on and claims priority under 35 USC 119 from Japanese Patent Application No. 2020-146392 filed on Aug. 31, 2020, the disclosure of which is incorporated by reference herein.

BACKGROUND

Technical Field

The present disclosure relates to an onboard display control device, an onboard display device, a display control method and a display control program.

Related Art

In the vehicle control device disclosed in Japanese Patent Application Laid-Open (JP-A) No. 2020-091778, in a case in which it is judged that an autonomous vehicle cannot merge while autonomous driving is continued, the driver of the own vehicle is given advance notice that he/she must carry out manual operation in order to merge the own vehicle from the traveling lane into the lane to be merged into (merging destination lane). This warning is carried out by the outputting of an image onto a display or by voice output from a speaker.

SUMMARY

The above-described related art does not disclose how to concretely give warning of the necessity of driver intervention into the driving operation, by output of an image onto a display or voice output from a speaker.

In view of the above-described circumstances, an object of the present disclosure is to provide an onboard display control device, an onboard display device, a display control method and a display control program in which, in a case in which merging by autonomous driving is attempted, it is easy for the vehicle occupant to understand the need to intervene in the driving operation.

An onboard display control device of a first aspect of the present disclosure is an onboard display control device that is installed in a vehicle configured to enable autonomous driving, the device including: an information acquisition section that is configured to, in a case in which the vehicle attempts to merge from a traveling lane into a merging destination lane during autonomous driving, acquires information regarding a point at which the attempt will be aborted, before the vehicle arrives at the point; and a display control section is configured to displays the information regarding the point that is acquired by the information acquisition section, before the arrival at the point, at a display portion that is provided within a vehicle cabin of the vehicle.

In the first aspect, the onboard display control device that is installed in a vehicle configured to enable autonomous driving has the information acquisition section and the display control section. In a case in which the vehicle attempts to merge from a traveling lane into a merging destination lane during autonomous driving, the information acquisition section acquire information regarding a point at which the attempt will be aborted, before the vehicle arrives at that point. The display control section displays the information regarding the point that is acquired by the information acquisition section, before the arrival at the point, at a display portion that is provided within the vehicle cabin of the vehicle. Due thereto, the occupant of the vehicle can visually grasp up to when the attempt to merge in autonomous driving will continue. As a result, the vehicle occupant can easily understand, in advance, the necessity of intervening in the driving operation.

In an onboard display control device of a second aspect of the present disclosure, in the first aspect, the information acquisition section is configured to acquire information regarding the traveling lane, and, on the basis of the information acquired by the information acquisition section, the display control section displays, at the display portion, an image in which an image of the traveling lane and an image of the point are combined.

In the second aspect, in a case in which the vehicle attempts to merge from a traveling lane into a merging destination lane during autonomous driving, the information acquisition section acquires information regarding the point at which the attempt will be aborted, and information regarding the traveling lane. On the basis of the information acquired by the information acquisition section, the display control section displays, at the display portion, an image in which an image of the traveling lane and an image of the point are combined. Due thereto, the occupant of the vehicle can more easily visually grasp up to when the attempt to merge in autonomous driving will continue.

In an onboard display control device of a third aspect of the present disclosure, in the second aspect, the display control section displays, at the display portion, an image of a fixed segment that is established in the traveling lane and that has the point as a starting point.

In the third aspect, in a case in which the vehicle attempts to merge from a traveling lane into a merging destination lane during autonomous driving, an image, which combines an image of the traveling lane and an image of a fixed segment that is established in the traveling lane and that has the point as a starting point at which the attempt will be aborted, is displayed at the display portion. Due thereto, the occupant of the vehicle can visually recognize this point easily as compared with a case in which, for example, only the point is displayed at the display portion.

In an onboard display control device of a fourth aspect of the present disclosure, in the third aspect, the fixed segment includes a driving hand-over request segment in which at least one of steering or acceleration of the vehicle is controlled by the vehicle, and in which an occupant of the vehicle is urged to intervene in driving operation.

In the fourth aspect, in a case in which the vehicle attempts to merge from a traveling lane into a merging destination lane during autonomous driving, an image of a fixed segment, which is established in the traveling lane and that has the point as a starting point at which the attempt will be aborted, is displayed at the display portion. This fixed segment includes a driving hand-over request segment in which at least one of steering or acceleration of the vehicle is controlled by the vehicle, and in which an occupant of the vehicle is urged to intervene in the driving operation. Because this driving hand-over request segment is displayed at the display portion in advance, for example, it is easy for the occupant of the vehicle to make, in advance, preparations to intervene in the driving operation.

In an onboard display control device of a fifth aspect of the present disclosure, in the third or fourth aspect, the fixed segment includes a braking segment in which the vehicle is automatically stopped in a case in which an occupant of the vehicle does not intervene in driving operation.

In the fifth aspect, in a case in which the vehicle attempts to merge from a traveling lane into a merging destination lane during autonomous driving, an image of a fixed segment, which is established in the traveling lane and that has the point as a starting point at which the attempt will be aborted, is displayed at the display portion. This fixed segment includes a braking segment in which the vehicle is automatically stopped in a case in which an occupant of the vehicle does not intervene in the driving operation. Due thereto, in a case in which the occupant of the vehicle does not intervene in the driving operation, the point at which braking of the vehicle will start, and the point at which automatic stoppage will occur, and the like can be known in advance.

In an onboard display control device of a sixth aspect of the present disclosure, in any one of the third aspect through the fifth aspect, the display control section displays the fixed segment as a belt-shaped image at the display portion.

In the sixth aspect, the display control section displays, at the display portion, an image in which an image of the traveling lane and a belt-shaped image are combined. The fixed segment that is shown as this belt-shaped image is a segment that has the point as a starting point at which the attempt to merge in autonomous driving will be aborted. Because the fixed segment is displayed as a belt-shaped image in this way, it is easy for the occupant of the vehicle to visually recognize the point as compared with a case in which, for example, the point is displayed at the display portion as a dot-shaped or a linear image.

In an onboard display control device of a seventh aspect of the present disclosure, in any one of the third aspect through the sixth aspect, the display control section displays, at the display portion, an image of the fixed segment in forms that differ for plural stages in accordance with a deferment time until the vehicle is stopped automatically in a case in which an occupant of the vehicle does not intervene in driving operation.

In the seventh aspect, the image of the fixed segment, which the display control section displays at the display portion, is displayed in forms that differ for plural stages in accordance with a deferment time until the vehicle is stopped automatically in a case in which the occupant of the vehicle does not intervene in the driving operation. Due thereto, the occupant of the vehicle can easily recognize the deferment time until automatic stoppage.

In an onboard display control device of an eighth aspect of the present disclosure, in any one of the third aspect through the seventh aspect, the display control section displays, at the display portion, an image of the fixed segment in forms that differ for plural stages in correspondence with a change in control of the autonomous driving that is carried out in a case in which an occupant of the vehicle does not intervene in driving operation.

In the eighth aspect, the image of the fixed segment, which the display control section displays at the display portion, is displayed in forms that differ for plural stages in correspondence with the change in the control of the autonomous driving that is carried out in a case in which the occupant of the vehicle does not intervene in the driving operation. Due thereto, in a case in which the occupant of the vehicle does not intervene in the driving operation, the occupant of the vehicle can easily recognize in advance that control of the autonomous driving will change.

In an onboard display control device of a ninth aspect of the present disclosure, in any one of the first aspect through the eighth aspect, in a case in which the vehicle arrives at the point, the display control section displays, at the display portion, a driving hand-over request image for urging an occupant of the vehicle to intervene in driving operation.

In the ninth aspect, in a case in which the vehicle arrives at the point at which the attempt to merge in autonomous driving is aborted, the display control section displays, at the display portion, the driving hand-over request image that is for urging an occupant of the vehicle to intervene in the driving operation. Due thereto, it is even easier for the occupant of the vehicle to recognize the necessity of intervening in the driving operation.

In an onboard display control device of a tenth aspect of the present disclosure, in any one of the first aspect through the ninth aspect, the display portion includes a head-up display that displays an image so as to overlap a front view that an occupant of the vehicle sees through a windshield.

In the tenth aspect, in a case in which the vehicle attempts to merge in autonomous driving, information regarding the point at which the attempt will be aborted can be displayed so as to overlap the front view that the occupant of the vehicle sees through the windshield. Due thereto, the occupant of the vehicle can recognize the information of this point, while viewing the front view through the windshield.

In an onboard display control device of an eleventh aspect of the present disclosure, in any one of the first aspect through the tenth aspect, the display portion includes a meter display that is provided at an instrument panel of the vehicle.

In the eleventh aspect, in a case in which the vehicle attempts to merge in autonomous driving, information regarding the point at which the attempt will be aborted is displayed on the meter display that is provided at the instrument panel. Due thereto, the occupant of the vehicle can confirm the information regarding the point in the meter display, even in a situation in which it is difficult to see the image displayed on the head-up display due to the effects of sunlight or the like for example.

In an onboard display control device of a twelfth aspect of the present disclosure, in any one of the first aspect through the eleventh aspect, the display control section displays the vehicle and a periphery thereof at the display portion as an image that models a state in which the vehicle and the periphery thereof are seen from an obliquely rear upper side of the vehicle.

In accordance with the twelfth aspect, the vehicle and the periphery thereof are displayed, at the display portion provided at the vehicle, as an image that models a state in which the vehicle and the periphery thereof are viewed from an obliquely rear upper side of the vehicle, and information regarding the point at which the attempt to merge during autonomous driving will be aborted is displayed at the display portion provided at the vehicle. As a result, the occupant of the vehicle can, while looking at an image of the own vehicle from a bird's eye view, confirm up to when the attempt to merge in autonomous driving will continue.

An onboard display device of a thirteenth aspect of the present disclosure is an onboard display device that is installed in a vehicle configured to enable autonomous driving, the device including: a display portion that is provided within a vehicle cabin of the vehicle; and the onboard display control device of any one of the first aspect through the twelfth aspect.

In the thirteenth aspect, the onboard display device that is installed in a vehicle configured to enable autonomous driving has a display portion that is provided within a vehicle cabin of the vehicle, and an onboard display control device. Because this onboard display control device is the device of any one of the first aspect through the twelfth aspect, the operation and effects that are described above are obtained.

A display control method of a fourteenth aspect of the present disclosure is a display control method that is executed by a processor that is installed in a vehicle configured to enable autonomous driving, the method including: in a case in which the vehicle attempts to merge from a traveling lane into a merging destination lane during autonomous driving, acquiring information regarding a point at which the attempt will be aborted, before the vehicle arrives at the point; and displaying the information regarding the point that has been acquired, before the arrival at the point, at a display portion that is provided within a vehicle cabin of the vehicle.

In the fourteenth aspect, the display control method that is executed by a processor that is installed in a vehicle configured to enable autonomous driving has the acquiring step and the displaying step. In the acquiring step, in a case in which the vehicle attempts to merge from a traveling lane into a merging destination lane during autonomous driving, information regarding a point at which the attempt will be aborted is acquired before the vehicle arrives at the point. In the displaying step, the information regarding the point that is acquired in the acquiring step is displayed before the arrival at the point, at a display portion that is provided within the vehicle cabin of the vehicle. Due thereto, the occupant of the vehicle can visually grasp up to when the attempt to merge in autonomous driving will continue. As a result, the vehicle occupant can easily understand in advance the necessity of intervening in the driving operation.

A display control program of a fifteenth aspect of the present disclosure is a display control program that is executed by a processor that is installed in a vehicle configured to enable autonomous driving, the program including: in a case in which the vehicle attempts to merge from a traveling lane into a merging destination lane during the autonomous driving, acquiring information regarding a point at which the attempt will be aborted, before the vehicle arrives at the point; and displaying the information regarding the point that has been acquired in the acquiring step, before the arrival at the point, at a display portion that is provided within a vehicle cabin of the vehicle.

In the fifteenth aspect, the display control program, which is executed by a processor that is installed in a vehicle configured to enable autonomous driving, has the acquiring step and the displaying step. In the acquiring step, in a case in which the vehicle attempts to merge from a traveling lane into a merging destination lane during autonomous driving, information regarding a point at which the attempt will be aborted is acquired before the vehicle arrives at the point. In the displaying step, the information regarding the point that is acquired in the acquiring step is displayed before the arrival at the point, at a display portion that is provided within the vehicle cabin of the vehicle. Due thereto, the occupant of the vehicle can visually grasp up to when the attempt to merge in autonomous driving will continue. As a result, the vehicle occupant can easily understand in advance the necessity of intervening in the driving operation.

As described above, in the onboard display control device, the onboard display device, the display control method and the display control program relating to the present disclosure, in a case in which merging in autonomous driving is attempted, it is easy for a vehicle occupant to understand the need to intervene in the driving operation.

BRIEF DESCRIPTION OF THE DRAWINGS

Exemplary embodiments of the present disclosure will be described in detail based on the following figures, wherein:

FIG. 4A is a drawing showing a usual image of a head-up display in the first embodiment;

FIG. 4B is a drawing showing a usual image of a meter display in the first embodiment;

FIG. 6B is a drawing showing a driving hand-over request image of the meter display of the first embodiment;

FIG. 10B is a drawing showing an image for merging of the meter display of the second embodiment;

DETAILED DESCRIPTION

First Embodiment

Figure 1:
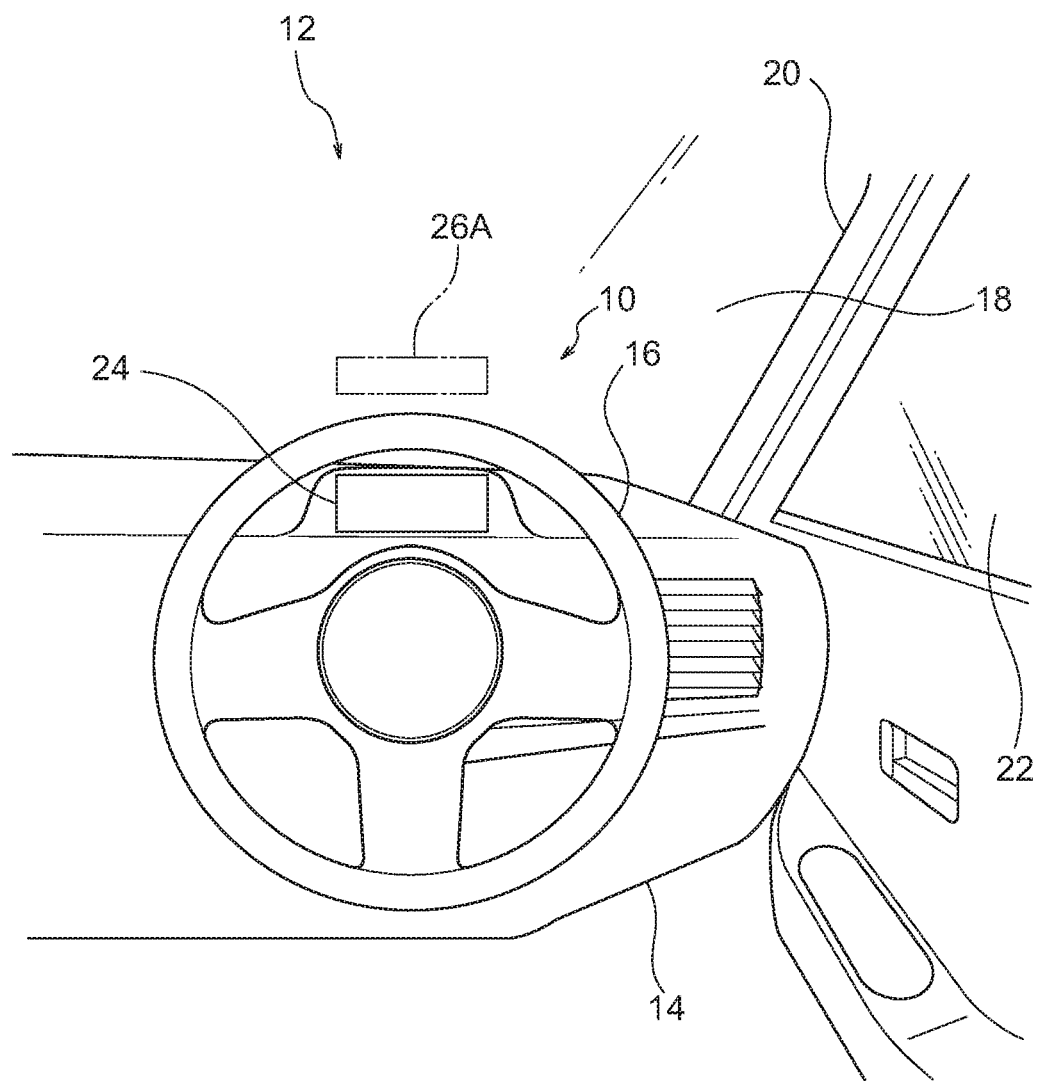
FIG. 1 is a perspective view showing a vehicle cabin front portion of a vehicle, in which an onboard display device relating to a first embodiment is installed, in a state of being seen from a vehicle rear side.

An onboard display device 10 relating to a first embodiment of the present disclosure is described hereinafter with reference to FIG. 1 through FIG. 9. This onboard display device 10 is installed in a vehicle 12 that is shown in FIG. 1. The vehicle 12 is structured so as to be able to switch between autonomous driving and manual driving. Hereinafter, the vehicle 12 will be called the "own vehicle 12".

(Structure of Own Vehicle)

As shown in FIG. 1, an instrument panel 14 is provided at the front portion of the vehicle cabin interior of the own vehicle 12. The instrument panel 14 extends in the vehicle transverse direction, and a steering wheel 16 is provided at the vehicle right side of the instrument panel 14. Namely, in the present embodiment, as an example, the own vehicle 12 is a right-hand-drive vehicle in which the steering wheel 16 is provided at the right side, and an unillustrated driver's seat is disposed at the right side within the vehicle cabin.

The instrument panel 14 is disposed at the vehicle lower side of a windshield glass 18. The windshield glass 18 is inclined so as to slope downward toward the vehicle front side, and divides the vehicle cabin interior and the vehicle cabin exterior. This windshield glass 18 corresponds to the "windshield" in the present disclosure.

The vehicle right side end portion of the windshield glass 18 is fixed to a front pillar 20 that is at the vehicle right side. The front pillar 20 extends in the vehicle vertical direction, and the windshield glass 18 is fixed to the vehicle transverse direction inner side end portion of the front pillar 20. Further, a front side glass 22 is disposed at the vehicle rear side of the front pillar 20. Note that the vehicle left side end portion of the windshield glass 18 is fixed to an unillustrated front pillar that is at the vehicle left side.

A meter display 24 that is the first display portion is provided at the upper portion of the instrument panel 14 at the vehicle front side of the driver's seat. The meter display 24 is provided at a position that is within the visual field in the state in which the sightline of the vehicle occupant who is in the driver's seat of the own vehicle 12 (hereinafter, simply called "occupant of the own vehicle 12") faces toward the vehicle front side.

Further, a head-up display (refer to FIG. 2; not shown in FIG. 1) 26 that is the second display portion is provided at the upper portion of the instrument panel 14 at the vehicle front side of the driver's seat. This head-up display (called "HUD" hereinafter) 26 is structured such that an image can be projected onto a display region 26A that is set at the lower portion of the windshield glass 18 at the vehicle front side of the driver's seat. The HUD 26 can display an image so as to be superposed on the front view that the occupant of the own vehicle 12 sees through the windshield glass 18.

(Structure of Onboard System)

Figure 2:
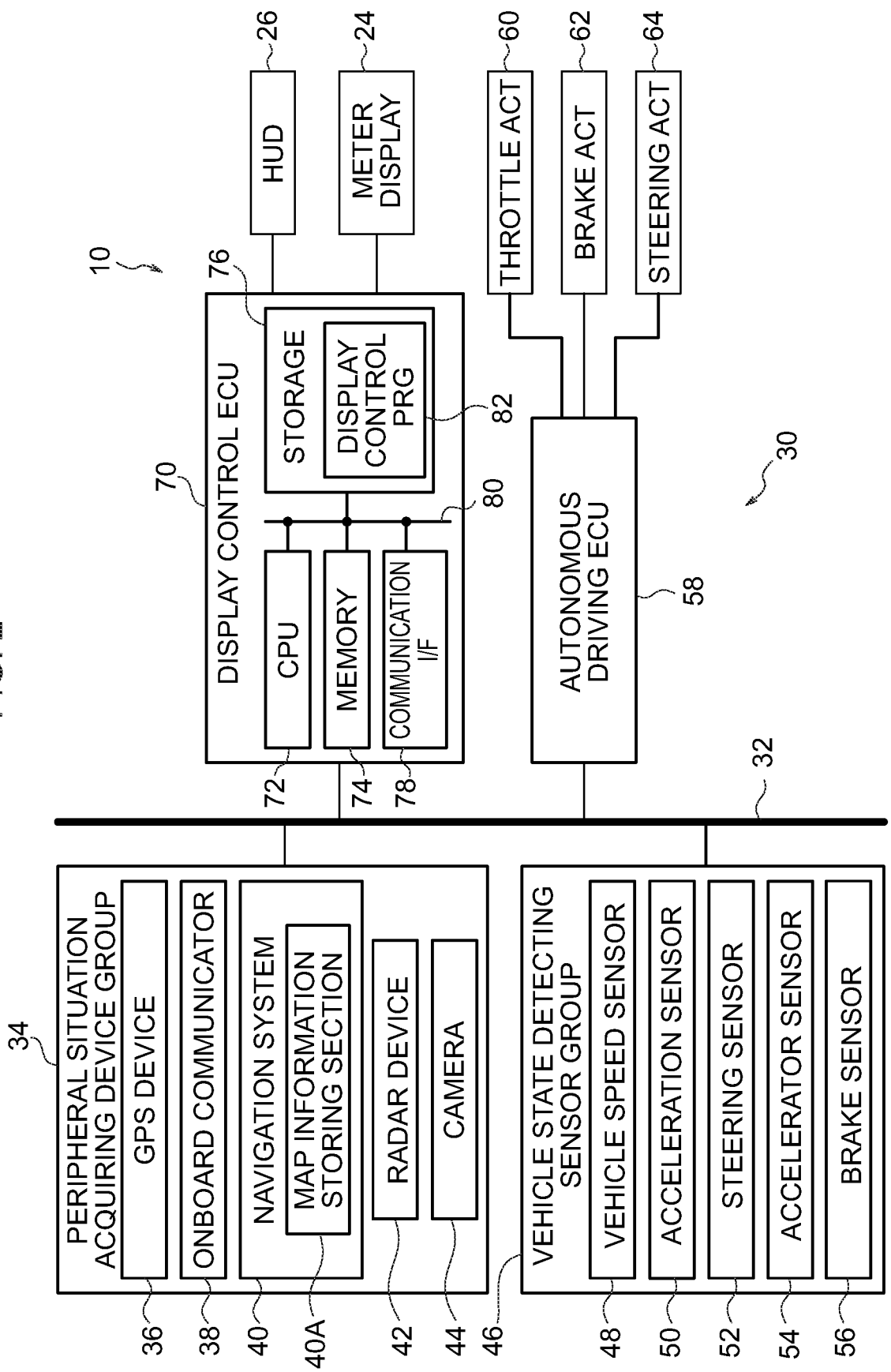
FIG. 2 is a block drawing showing some of the hardware structures of an onboard system that is structured to include the onboard display device relating to the first embodiment.

The structure of an onboard system 30 that is installed in the above-described own vehicle 12 is shown in a block drawing in FIG. 2. The onboard system 30 has a communication bus 32. A peripheral situation acquiring device group 34, a vehicle state detecting sensor group 46, an autonomous driving ECU (Electronic Control Unit) 58, and a display control ECU 70 are respectively connected to the communication bus 32. The display control ECU 70, together with the meter display 24 and the HUD 26, structure the onboard display device 10. Note that FIG. 2 shows only a portion of the onboard system 30.

The peripheral situation acquiring device group 34 includes a GPS (Global Positioning System) device 36, an onboard communicator 38, a navigation system 40, a radar device 42, a camera 44 and the like, as devices that acquire information expressing what type of situation the peripheral environment of the own vehicle 12 is.

The GPS device 36 receives GPS signals from plural GPS satellites, and measures the position of the own vehicle 12. The accuracy of measurement of the GPS device 36 increases as the number of GPS signals that can be received increases. The onboard communicator 38 is a communication device that carries out at least one of vehicle-to-vehicle communication with other vehicles and road-to-vehicle communication with roadside devices. The navigation system 40 includes a map information storing section 40A that stores map information. On the basis of the position information obtained from the GPS device 36 and the map information that is stored in the map information storing section 40A, the navigation system 40 carries out processings such as displaying the position of the own vehicle 12 on a map, and guiding the own vehicle 12 along the route to the destination.

The radar device 42 includes plural radar devices that have respectively different detection ranges, and detects peripheral objects, such as pedestrians and other vehicles and the like that exist at the periphery of the own vehicle 12, as point group information, and acquires the relative positions and the relative speeds of the own vehicle 12 and the detected peripheral objects. The radar device 42 incorporates therein a processing device that processes the results of detecting peripheral objects. On the basis of changes in the relative positions and the relative speeds of the individual peripheral objects that are included in the detection results of the most recent several times, and the like, this processing device excludes, from objects of monitoring, noise, roadside objects such guardrails and the like, and the like, and tracks specific objects such as pedestrians, other vehicles and the like as objects of monitoring. Then, the radar device 42 outputs information such as the relative positions and the relative speeds with respect to the individual objects of monitoring, and the like. The camera 44 captures images of the periphery of the own vehicle 12 by plural cameras, and outputs the captured images.

The vehicle state detecting sensor group 46 includes, as plural sensors that acquire the state of the own vehicle 12, a vehicle speed sensor 48 that detects the vehicle speed of the own vehicle 12, an acceleration sensor 50 that detects the acceleration that is applied to the own vehicle 12, a steering sensor 52 that detects the steering angle of the own vehicle 12, an accelerator sensor 54 that detects the amount of operation of the accelerator pedal of the own vehicle 12, and a brake sensor 56 that detects the amount of operation of the brake pedal of the own vehicle 12.

A throttle ACT 60 that changes the throttle opening of the own vehicle 12, and a brake ACT 62 that changes the braking force that the braking device of the own vehicle 12 generates, are connected to the autonomous driving ECU 58. Further, a steering ACT 64 that changes the amount of steering by the steering device of the own vehicle 12 is connected to the autonomous driving ECU 58.

The autonomous driving ECU 58 includes a CPU (Central Processing Unit), memories such as a RAM (Random Access Memory), a ROM (Read Only Memory) and the like, a non-volatile storage such as an HDD (Hard Disk Drive) or an SSD (Solid State Drive) or the like, and a communication I/F (Inter Face). Due to the CPU executing an autonomous driving program, in a case in which an autonomous driving mode is selected, the autonomous driving ECU 58 carries out autonomous driving processing that causes the own vehicle 12 to travel autonomously without being accompanied by driving operation of the occupant of the own vehicle 12. The autonomous driving processing is processing that, on the basis of information obtained from the peripheral situation acquiring device group 34 and the vehicle state detecting sensor group 46, judges the situations of the own vehicle 12 and the periphery thereof, and controls the throttle ACT 60, the brake ACT 62 and the steering ACT 64.

In the present embodiment, the level of the autonomous driving that the autonomous driving ECU 58 carries out is a level 2 or a level 3 for example. In level 2 and level 3 autonomous driving, for example, in cases of deviating from a controllable range, or in advance consideration of operations that are improper due to mis-detection, lack of detection, or malfunctioning of the sensors, or the like, the driver monitors the autonomous driving by the autonomous driving ECU 58, and intervention of the driver is requested as needed. Note that the level of autonomous driving that the autonomous driving ECU 58 carries out may be a level 4 or a level 5. In level 4 or level 5 autonomous driving, intervention by the driver is unnecessary.

Further, in the present embodiment, the autonomous driving that the autonomous driving ECU 58 carries out includes, for example, constant speed traveling at which the own vehicle 12 is made to travel in the same traveling lane at a constant speed, traveling while following in which the own vehicle 12 is made to follow another vehicle that is the closest to the own vehicle 12 and that exists in the same traveling lane within a predetermined distance (e.g., within 100 m) in front of the own vehicle 12, lane changing in which the own vehicle 12 is made to change lanes from the lane in which the own vehicle 12 is currently traveling (the own lane) to an adjacent lane, traveling while branching-off in which, at a branch in the road, the own vehicle 12 is made to branch-off from the traveling lane into the lane that branches-off, traveling while merging in which, at the merge region of a road, the own vehicle 12 is made to merge from the traveling lane into the lane to be merged into (merging destination lane), and the like.

In a case in which the above-described traveling while merging is to be carried out, the autonomous driving ECU 58 judges whether or not merging is possible with the autonomous driving being continued, on the basis of information such as the road shape of the traveling lane, the situations of other vehicles that are in merging destination lane, and the like that are acquired by the peripheral situation acquiring device group 34. In this case, for example, the autonomous driving ECU 58 acquires information such as the inter-vehicle distance between other vehicles that exist in the merging destination lane, the relative speeds between the own vehicle 12 and the other vehicles that exist in the merging destination lane, the final point of the traveling lane that the own vehicle 12 is traveling in, and the like, and carries out the aforementioned judgment by combining these information. As a result, in a case in which it is judged that the own vehicle 12 cannot merge with the autonomous driving being continued, the autonomous driving ECU 58, by using the onboard display device 10, requests that the occupant of the own vehicle 12 intervene in the driving operation. Due to this request, when the occupant of the own vehicle 12 operates at least any of the steering wheel, the accelerator pedal and the brake pedal of the own vehicle 12, that operation is detected by at least any of the steering sensor 52, the accelerator sensor 54 and the brake sensor 56. Due thereto, the autonomous driving ECU 58 carries out switching from the autonomous driving mode to the manual driving mode. The structure of the onboard display device 10 is described in detail hereinafter.

(Structure of Onboard Display Device)

The onboard display device 10 is structured by the aforementioned meter display 24 and HUD 26, and the display control ECU 70. The display control ECU 70 corresponds to the "onboard display control device" in the present disclosure. The display control ECU 70 includes a CPU (Central Processing Unit: processor) 72, a memory 74 such as a ROM (Read Only Memory) and a RAM (Random Access Memory) and the like, a non-volatile storage 76 such as an HDD (Hard Disk Drive) or an SSD (Solid State Drive) or the like, and a communication I/F (Inter Face) 78. The CPU 72, the memory 74, the storage 76 and the communication I/F 78 are connected so as to be able to communicate with one another via an internal bus 80. A display control program 82 is stored in the storage 76. This display control program 82 is a program for executing the display control method relating to the present disclosure. At the display control ECU 70, display control processing that is described later is carried out by the display control program 82 being read-out from the storage 76 and expanded in the memory 74, and the display control program 82 that has been expanded in the memory 74 being executed by the CPU 72. The HUD 26 and the meter display 24 are electrically connected to the display control ECU 70.

Figure 3:
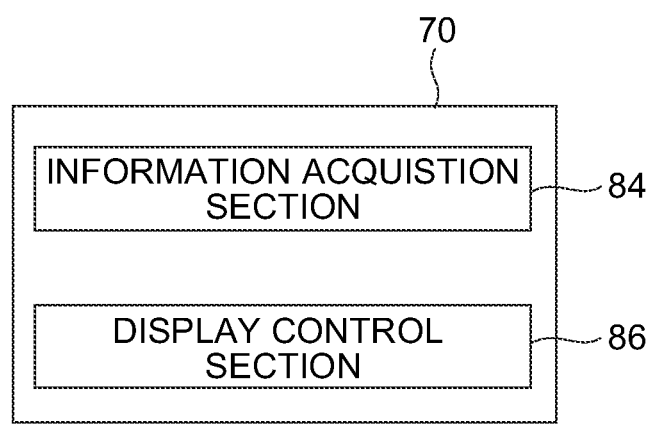
FIG. 3 is a block drawing showing some of the functional structures of the onboard display device relating to the first embodiment.

The display control ECU 70 realizes various functions by using the above-described hardware resources. Some of the functional structures that are realized by the display control ECU 70 are shown in a block drawing in FIG. 3. As shown in FIG. 3, the display control ECU 70 includes, as the functional structures thereof, an information acquisition section 84 and a display control section 86. These functional structures are realized by the CPU 72 reading-out and executing the display control program 82 that is stored in the storage 76.

The information acquisition section 84 acquires, from the autonomous driving ECU 58, information of the lane and information of peripheral objects and the like that are recognized by the autonomous driving ECU 58. The information of the lane includes information regarding the traveling lane that is the lane in which the own vehicle 12 is currently traveling (information such as whether the lane is straight or curves or the like), information relating to the adjacent lanes that are adjacent at the left and right of the own lane (the absence/presence of adjacent lanes, and the like), information of a branching-off lane that branches-off from the traveling lane, information of a merging destination lane that the traveling lane merges into, and the like. In a case in which the own vehicle 12 attempts to merge from the traveling lane into a merging destination lane during autonomous driving, this information that the information acquisition section 84 acquires includes information of a first point (refer to P1 shown in FIG. 7 and FIG. 8) that is the point at which the attempt is to be aborted. The information acquisition section 84 acquires information of the first point before the own vehicle 12 arrives at the first point.

Figure 5A:
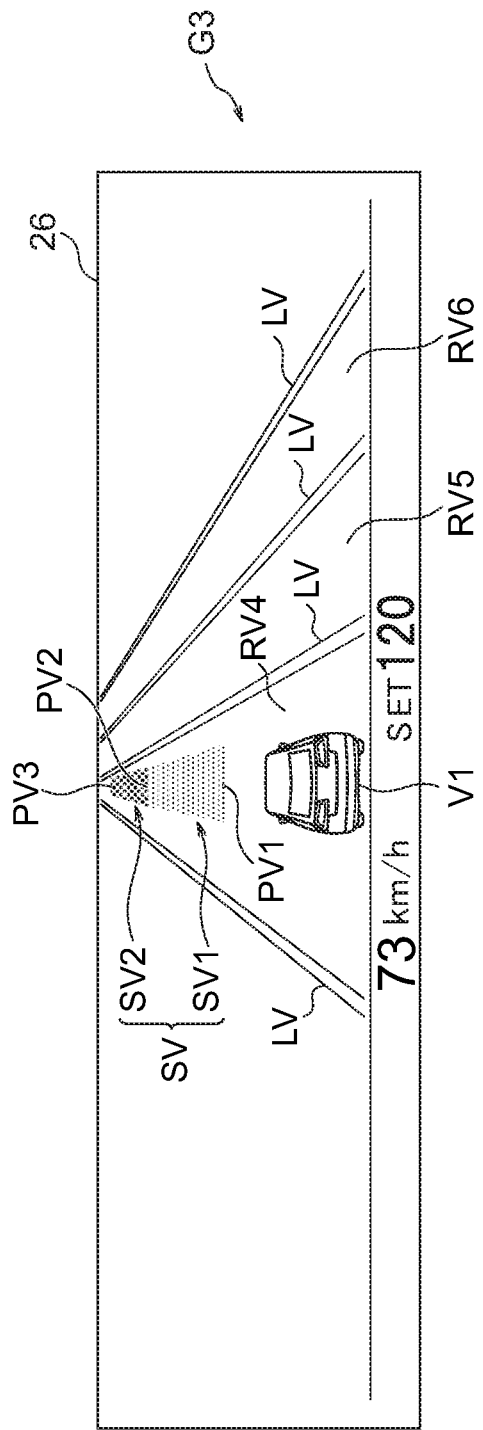
FIG. 5A is a drawing showing an image for merging of the head-up display of the first embodiment.
Figure 5B:
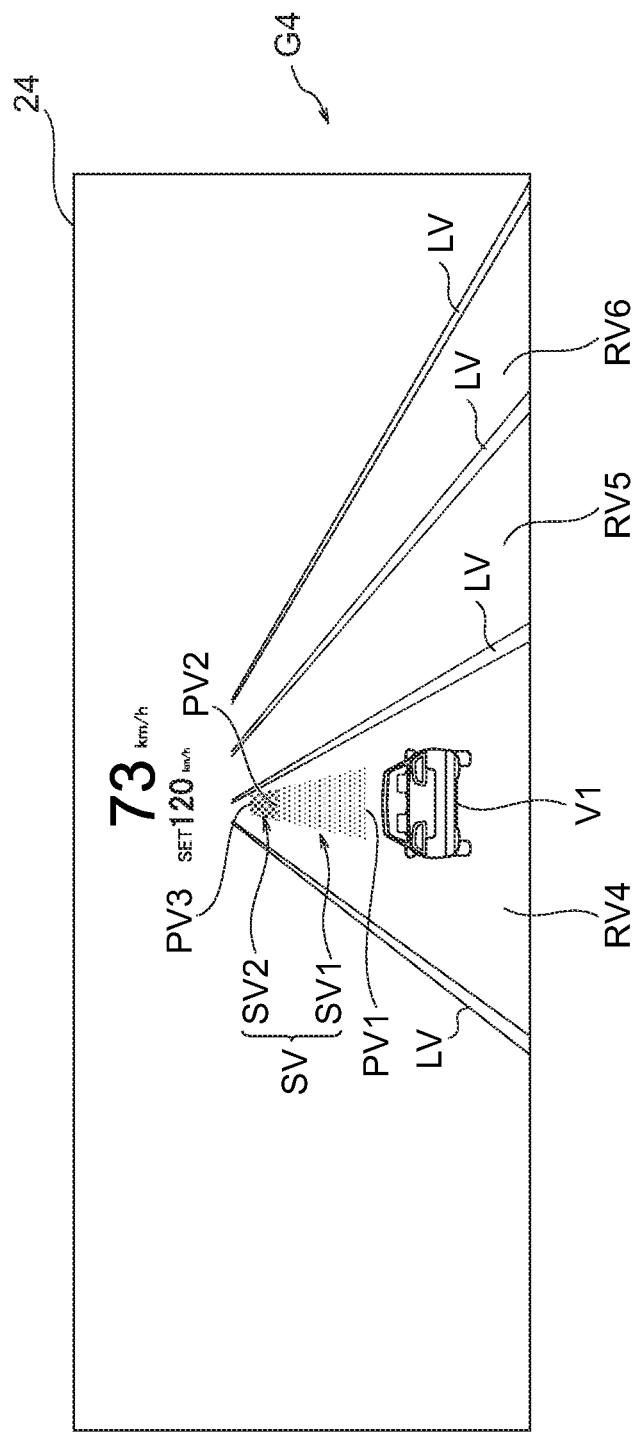
FIG. 5B is a drawing showing an image for merging of the meter display of the first embodiment.
Figure 6A:
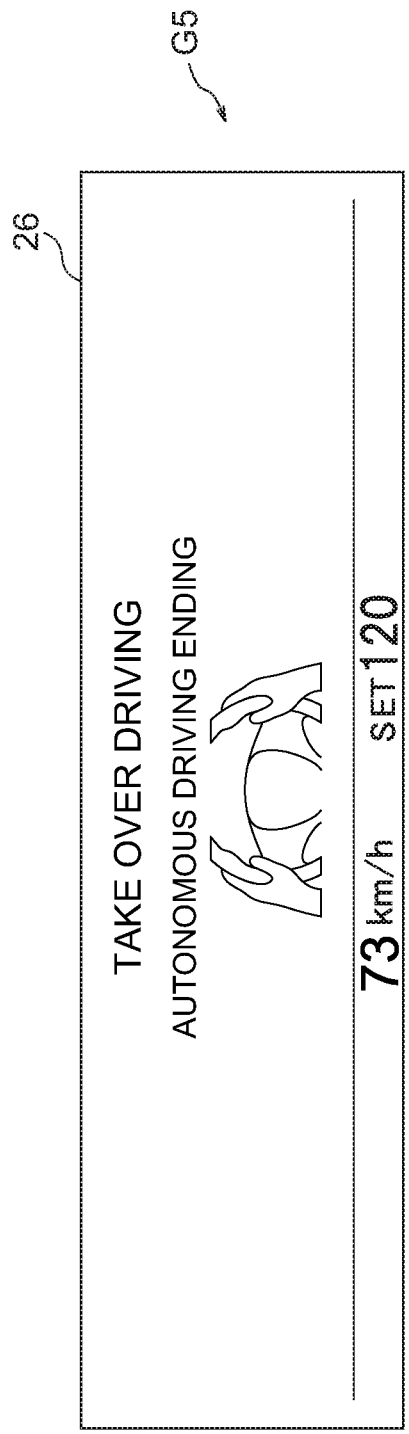
FIG. 6A is a drawing showing a driving hand-over request image of the head-up display of the first embodiment.

On the basis of the information acquired by the information acquisition section 84, the display control section 86 controls the display of the HUD 26 and the meter display 24. As an example, the display control section 86 can make the HUD 26 and the meter display 24 display usual images that are shown in FIG. 4A and FIG. 4B, images for merging that are shown in FIG. 5A and FIG. 5B, and driving hand-over request images that are shown in FIG. 6A and FIG. 6B. Note that, in the examples that are shown in FIG. 4A through FIG. 6B, the current speed of the own vehicle 12 and the set speed of the cruise control are displayed in the lower portion of the display region 26A of the HUD 26 and in the upper portion of the meter display 24. Further, in the example shown in FIG. 4B, planned operations M1 through M3 of the autonomous driving are displayed in the right side portion of the meter display 24.

In FIG. 4A, a first-person one-lane display image G1, which is an example of a usual image, is displayed on the HUD 26. This first-person one-lane display image G1 is an image that models the front view that the occupant of the own vehicle 12 sees through the windshield glass 18. The first-person one-lane display image G1 is displayed in cases in which, for example, the autonomous driving ECU 58 causes the own vehicle 12 to carry out constant speed traveling or traveling while following. An image RV1 of the traveling lane in which the own vehicle 12 is currently traveling, images LV of the borderlines of the traveling lane, an image V2 of a peripheral object that exists in front of the own vehicle 12 (another vehicle in the example shown in FIG. 4A) are included as objects of display in the first-person one-lane display image G1. Images of adjacent lanes that are adjacent at the left and the right of the traveling lane are excluded from objects of display in this first-person one-lane display image G1. The first-person one-lane display image G1 is an image that minimizes difficulty by, on the one hand, displaying the image RV1 of the traveling lane of the own vehicle 12 as large as possible, and, on the other hand, omitting display of information that has little importance to the vehicle occupant understanding the state of the autonomous driving.

In FIG. 4B, a third-person multiple lane display image G2 that is an example of a usual image is displayed on the meter display 24. This third-person multiple lane display image G2 is an image in which the own vehicle 12 and the periphery thereof are shown in a state of being seen from an obliquely rear upper side (a bird's eye view) of the own vehicle 12. This third-person multiple lane display image G2 is displayed in cases in which, for example, the autonomous driving ECU 58 causes the own vehicle 12 to carry out constant speed traveling or traveling while following. Images RV2, RV3 of the adjacent lanes that are adjacent at the left and right of the traveling lane are included as objects of display in the third-person multiple lane display image G2. As an example, a maximum of three lanes can be displayed in the third-person multiple lane display image G2. However, in order to make it easy to understand the transitional state that accompanies branching-off or merging, or the like, the number of lanes that are displayed is not limited to a maximum of three lanes, and the number of lanes that are displayed is changed appropriately. The image RV1 of the traveling lane, the images RV2, RV3 of the adjacent lanes, the images LV of the borderlines of these traveling lanes, the image V2 of a peripheral object that exists in the traveling lane in front of the own vehicle 12 (another vehicle in the example shown in FIG. 4B), and an image V3 of a peripheral object that exists in an adjacent lane (another vehicle in the example shown in FIG. 4B) are included as objects of display in the third-person multiple lane display image G2.

In FIG. 5A, a third-person merge region display image G3 that is an example of an image for merging is displayed on the HUD 26. This third-person merge region display image G3 is an image in which the own vehicle 12 and the periphery thereof are shown in a state of being seen from an obliquely rear upper side (a bird's eye view) of the own vehicle 12. The third-person merge region display image G3 is displayed in cases in which the autonomous driving ECU 58 causes the own vehicle 12 to travel while merging. As an example, an image RV4 of the traveling lane in which the own vehicle 12 is traveling (the merge lane), an image RV5 of the lane that the own vehicle 12 will merge into, and an image RV6 of the adjacent lane that is adjacent to the merging destination lane, are included as objects of display in the third-person merge region display image G3. Note that, although not illustrated in FIG. 5A, images of the other vehicles that exist in the traveling lane and in the merging destination lane also are included as objects of display in the third-person merge region display image G3.

In FIG. 5B, a third-person merge region display image G4 that is an example of an image for merging is displayed on the meter display 24. This third-person merge region display image G4 is basically similar to the third-person merge region display image G3 that is displayed on the HUD 26, and is displayed in cases in which the autonomous driving ECU 58 causes the own vehicle 12 to travel while merging.

In FIG. 6A, a hands-on image G5 that is an example of a driving hand-over request image is displayed on the HUD 26. An image showing a state in which the steering wheel is being grasped by both hands, and an image of words such as "take over driving" and "autonomous driving is ending", are included in the hands-on image G5. This hands-on image G5 is an image that urges the occupant of the own vehicle 12 to intervene in the driving operation, and is displayed, for example, in cases in which the autonomous driving ECU 58 aborts the attempt to merge in autonomous driving.

In FIG. 6B, a hands-on image G6 that is an example of a driving hand-over request image is displayed on the meter display 24. The hands-on image G6 is basically similar to the hands-on image G5 that is displayed on the HUD 26, and is displayed, for example, in cases in which the autonomous driving ECU 58 aborts the attempt to merge in autonomous driving.

Figure 7:
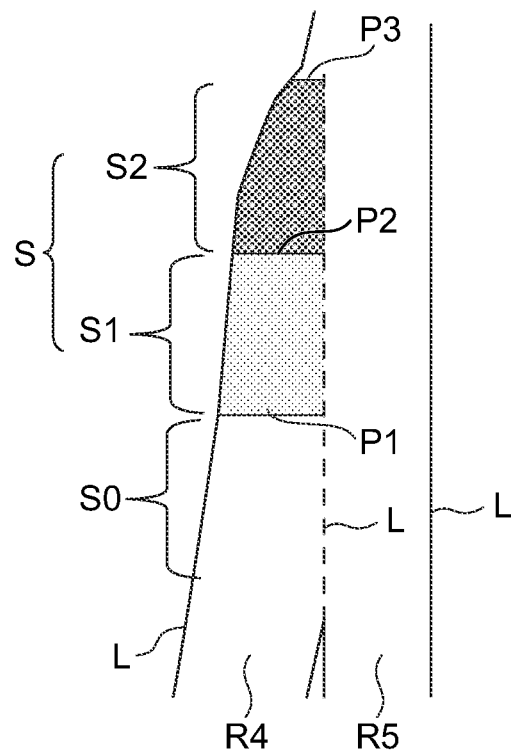
FIG. 7 is a schematic drawing showing an example of a merge region of a road.
Figure 8:
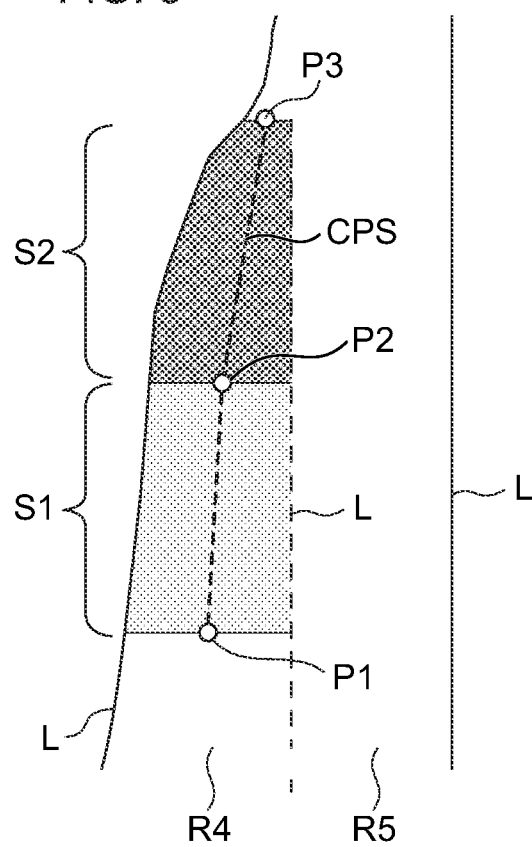
FIG. 8 is a schematic drawing that corresponds to a portion of FIG. 7 and is for explaining a method of setting a driving hand-over request segment and a braking segment.

Here, in the onboard display device 10 of the present exemplary embodiment, at a merge region of a road shown in FIG. 7 and FIG. 8 for example, in a case in which the own vehicle 12 attempts to merge from traveling lane R4 into merging destination lane R5 during autonomous driving, information of the first point P1 at which the attempt will be aborted is acquired by the information acquisition section 84. Note that, in FIG. 7 and FIG. 8, L is the border between the traveling lane R4 and the traveling lane R5.

The display control section 86 displays the information of the first point P1 that was acquired by the information acquisition section 84, on the HUD 26 and the meter display 24 before the own vehicle 12 arrives at the first point P1. Specifically, as shown in FIG. 5A and FIG. 5B, the display control section 86 displays the third-person merge region display images G3, G4 on the HUD 26 and the meter display 24. The image RV4 of the traveling lane R4, the image RV5 of the merging destination lane R5, the image RV6 of adjacent lane R6 that is adjacent to the merging destination lane R5, and the images LV of the borderlines L of the respective lanes R4, R5, R6 are displayed in these third-person merge region display images G3, G4. Moreover, the display control section 86 combines image SV, which is of a fixed segment S (see FIG. 7 and FIG. 8) that has the first point P1 as a starting point and that is established in the traveling lane R4, with the third-person merge region display images G3, G4, and displays the combined image.

In the example shown in FIG. 5A and FIG. 5B, the aforementioned fixed segment S is displayed, as the image SV that is belt-shaped, on the HUD 26 and the meter display 24. In the present embodiment, this fixed segment S is structured by driving hand-over request segment S1 and braking segment S2 that are shown in FIG. 7 and FIG. 8. The driving hand-over request segment S1 is a segment in which at least either of steering and acceleration of the own vehicle 12 is controlled by the autonomous driving ECU 58, and the occupant of the own vehicle 12 is urged to intervene in the driving operation. This driving hand-over request segment S1 extends from its starting point that is the first point P1 toward a final point P3 side of the image RV4 of the traveling lane R4. The final point of the driving hand-over request segment S1 is second point P2 that is the starting point of the braking segment S2. The braking segment S2 is a segment in which, in a case in which the occupant of the own vehicle 12 does not intervene in the driving operation, the autonomous driving ECU 58 causes the own vehicle 12 to brake in order to automatically stop the own vehicle 12. This braking segment S2 extends from its starting point that is the second point P2 to the final point P3 of the image RV4 of the traveling lane R4.

The position information of the final point P3 of the traveling lane RV4 is stored in the map information storing section 40A. Central point sequence CPS (see FIG. 8) of the traveling lane RV4 is stored in the map information storing section 40A. The above-described first point P1, second point P2 and final point P3 are set on this central point sequence CPS. The autonomous driving ECU 58 sets the driving hand-over request segment S1 and the braking segment S2, which are determined by the first point P1, the second point P2 and the final point P3, on the basis of the position information of the final point P3. Specifically, for example, the driving hand-over request segment S1 and the braking segment S2 are established as segments that the subject vehicle 12 will pass through in a time period of several seconds (e.g., a four-second time period) at the current vehicle speed, respectively.

The display control section 86 displays the driving hand-over request segment S1 and the braking segment S2, which are set as described above, as images SV1, SV2 of different forms (here, different colors) on the HUD 26 and the meter display 24. In the present embodiment, the driving hand-over request segment S1 is displayed as the image SV1 that is yellow and belt-shaped, and the braking segment S2 is displayed as the image SV2 that is orange and belt-shaped, on the HUD 26 and the meter display 24 respectively. Note that, in FIG. 5A and FIG. 5B, dots are applied instead of colors to the images SV1, SV2.

Namely, in the present embodiment, the image SV of the fixed segment S whose starting point is the first point P1 is displayed on the HUD 26 and the meter display 24 in forms (colors) that differ in two stages that are the image SV1 of the driving hand-over request segment S1 and the image SV2 of the braking segment S2. The respective segments S1, S2 (the respective images SV1, SV2) correspond to the deferment time until the own vehicle 12 is automatically stopped (emergency-stopped) in a case in which the occupant of the own vehicle 12 does not intervene in the driving operation.

Further, the respective segments S1, S2 correspond to the change in the control of the autonomous driving that is carried out in a case in which the occupant of the own vehicle 12 does not intervene in the driving operation. Concretely, in the driving hand-over request segment S1, the autonomous driving ECU 58 requests the occupant of the own vehicle 12 to intervene in the driving operation, by using the onboard display device 10. In this case, when the display control section 86 senses, on the basis of information from the autonomous driving ECU 58, that the own vehicle 12 has arrived at the first point P1, the display control section 86 displays the hands-on images G5, G6 that are shown in FIG. 6A and FIG. 6B on the HUD 26 and the meter display 24. On the other hand, in the braking segment S2, the autonomous driving ECU 58 carries out braking in order to automatically stop the own vehicle 12. In the driving hand-over request segment S1 and the braking segment S2, when the occupant of the own vehicle 12 operates at least any of the steering wheel, the accelerator pedal and the brake pedal of the own vehicle 12, the autonomous driving ECU 58 switches from the autonomous driving mode to the manual driving mode.

Figure 9:
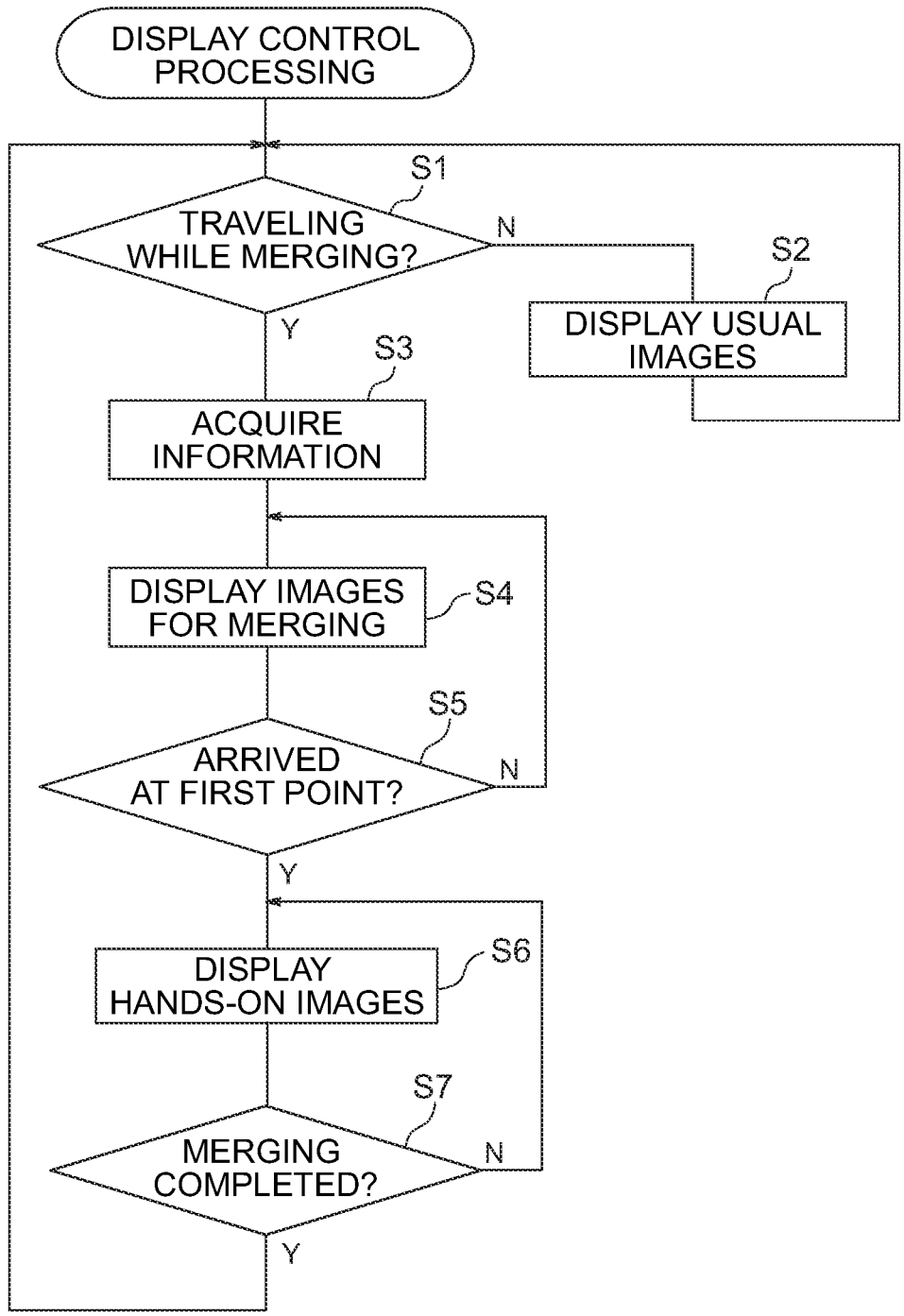
FIG. 9 is a flowchart showing an example of the flow of display control processing in the first embodiment.

An example of the flow of display control processing that is executed by the display control ECU 70 is shown in a flowchart in FIG. 9. This display control processing is executed due to the CPU 72 reading-out the display control program 82 from the storage 76, and expanding and executing the program in the memory 74. This display control processing is executed during autonomous driving of the own vehicle 12 by the autonomous driving ECU 58.

In this display control processing, first, in step S1, by the function of the information acquisition section 84, the CPU 72 judges whether or not the autonomous driving ECU 58 is starting to cause the own vehicle 12 to travel while merging. If this judgment is negative, the routine moves on to step S2, and, if this judgement is affirmative, the routine moves on to step S3.

In the case of moving on to step S2, by the function of the display control section 86, the CPU 72 displays the first-person one lane display image G1 and the third-person multiple lane display image G2, which are usual images respectively, on the HUD 26 and the meter display 24. When the processing of this step S2 is completed, the routine returns to step S1.

In the case of moving on to step S3, by the function of the information acquisition section 84, the CPU 72 acquires information of the periphery of the own vehicle 12. Information of the first point, at which the attempt to merge in autonomous driving is aborted, also is included in this information. This information is acquired by the information acquisition section 84 before the own vehicle 12 arrives at the first point P1. This step S3 corresponds to the "acquiring step" in the present disclosure. When the processing of step S3 is completed, the routine moves on to next step S4.

In step S4, by the function of the display control section 86, the CPU 72 displays the images G3, G4 for merging on the HUD 26 and the meter display 24 respectively, and combines the image SV of the fixed segment S, whose starting point is the first point P1, with the images G3, G4 for merging, and displays the combined image. This display is carried out before the own vehicle 12 arrives at the first point P1. This step S4 corresponds to the "displaying step" of the present disclosure. When the processing of step S4 is completed, the routine moves on to step S5.

In step S5, on the basis of the information acquired by the function of the information acquisition section 84, the CPU 72 judges whether or not the own vehicle 12 has arrived at the first point P1. If this judgment is negative, the routine returns to above-described step S4, and, if this judgment is affirmative, the routine moves on to next step S6.

In the case of moving on to step S6, by the function of the display control section 86, the CPU 72 displays the hands-on images G5, G6 on the HUD 26 and the meter display 24 respectively. When the processing of step S6 is completed, the routine moves on to next step S7.

In the case of moving on to step S7, the CPU 72 judges whether or not the own vehicle 12 has completed merging from the traveling lane into the merging destination lane. If this judgment is negative, the routine returns to step S6, and, if this judgment is affirmative, the routine returns to step S1.

(Operation and Effects)

Operation and effects of the present embodiment are described next.

As described above, in the present embodiment, in a case in which the own vehicle 12 attempts merging from the traveling lane R4 into the merging destination lane R5 during autonomous driving, the information acquisition section 84 acquires information of the first point, which is where this attempt will be aborted, before the own vehicle 12 arrives at the first point P1. The display control section 86 displays the information of the first point P1, which was acquired by the information acquisition section, on the HUD 26 and the meter display 24 before the own vehicle 12 arrives at the first point P1. Due thereto, the occupant of the own vehicle 12 can visually understand up to when the attempt to merge by autonomous driving will be continued.

As a result, the vehicle occupant can easily understand in advance the necessity of intervening in the driving operation.

Further, in the present embodiment, an image, in which the image RV4 of the traveling lane R4 in which the own vehicle 12 is traveling and image PV1 of the first point P1 are combined, is displayed on the HUD 26 and the meter display 24. Due thereto, the occupant of the own vehicle 12 can more easily visually understand up to when the attempt to merge by autonomous driving will continue.

In the present embodiment, the image SV of the fixed segment S, which is set on the traveling lane RV4 and whose starting point is the first point P1, and the image RV4 of the traveling lane R4 are combined and displayed on the HUD 26 and the meter display 24. Due thereto, the occupant of the own vehicle 12 can visually confirm the first point P1 easily as compared with a case in which, for example, only the image PV1 of the first point P1 is displayed on the HUD 26 and the meter display 24.

In the present embodiment, the fixed segment S that is displayed on the HUD 26 and the meter display 24 includes the driving hand-over request segment S1 in which at least either of steering and acceleration of the own vehicle 12 is controlled by the autonomous driving ECU 58, and in which the occupant of the own vehicle 12 is urged to intervene in the driving operation. Because this driving hand-over request segment S1 is displayed in advance on the HUD 26 and the meter display 24, for example, it is easy for the occupant of the own vehicle 12 to make, in advance, preparations to intervene in the driving operation.

Further, in the present embodiment, the fixed segment S that is displayed on the HUD 26 and the meter display 24 includes the braking segment S2 in which the own vehicle 12 is automatically stopped in a case in which the occupant of the own vehicle 12 does not intervene in the driving operation. Due thereto, in a case in which the occupant of the own vehicle 12 does not intervene in the driving operation, the occupant of the vehicle can know in advance of the point at which braking of the own vehicle 12 will start, the point at which automatic stoppage will occur, and the like.

In the present embodiment, the fixed segment S is displayed on the HUD 26 and the meter display 24 as the belt-shaped image SV whose starting point is the first point P1. Due thereto, it is easy for the occupant of the own vehicle 12 to visually confirm the first point P1 as compared with a case in which, for example, the first point P1 is displayed as a dot-shaped or a linear image.

Further, in the present embodiment, the image SV of the fixed segment S is displayed in forms (colors) that differ in two stages that are the driving hand-over request segment S1 and the braking segment S2, in accordance with the deferment time until the own vehicle 12 is automatically stopped in a case in which the occupant of the own vehicle 12 does not intervene in the driving operation. Due thereto, it is easy for the occupant of the own vehicle 12 to recognize the deferment time until automatic stoppage.

In the present embodiment, the image SV of the fixed segment S is displayed in forms (colors) that differ in two stages that are the driving hand-over request segment S1 and the braking segment S2, in correspondence with the change in the control of the autonomous driving that is carried out in a case in which the occupant of the own vehicle 12 does not intervene in the driving operation. Due thereto, in a case in which the occupant of the own vehicle 12 does not intervene in the driving operation, it is easy for the occupant of the own vehicle 12 to understand in advance that control of the autonomous driving will change.

In the present exemplary embodiment, in a case in which the own vehicle 12 arrives at the first point P1 at which an attempt to merge in autonomous driving is aborted, the hands-on images G5, G6 for urging the occupant of the own vehicle 12 to intervene in the driving operation are displayed on the HUD 26 and the meter display 24. Due thereto, it is even easier for the occupant of the own vehicle 12 to recognize the necessity of intervening in the driving operation.

In the present embodiment, in a case in which the own vehicle 12 attempts merging in autonomous driving, information of the first point P1 (here, the image PV1) is displayed so as to be superposed on the front view that the occupant of the own vehicle 12 sees through the windshield glass 18. Due thereto, the occupant of the own vehicle 12 can confirm the first point P1 while looking at the front view through the windshield glass 18.

Further, in the present embodiment, the image of the first point P1 is displayed also on the meter display 24 that is provided at the instrument panel 14. Due thereto, the occupant of the own vehicle 12 can confirm the first point P1 in the meter display 24, even in a situation in which it is difficult to see the image displayed on the HUD 26 due to the effects of sunlight or the like for example.

Further, in the present embodiment, at the time when the own vehicle 12 is traveling while merging, the third-person images G3, G4 for merging are displayed on the HUD 26 and the meter display 24. In these third-person images G3, G4 for merging, the own vehicle 12 and the periphery thereof are displayed as images that model a state in which the own vehicle 12 and the periphery thereof are seen from an obliquely rear upper side of the own vehicle 12, and the image PV1 of the first point P1 at which an attempt to merge in autonomous driving is aborted is displayed. Due thereto, the occupant of the own vehicle 12 can, while looking at an image of the own vehicle 12 from a bird's eye view, confirm up to when the attempt to merge in autonomous driving will continue.

Other embodiments of the present disclosure are described next. Note that structures and operations that are basically similar to those of the first embodiment are denoted by the same reference numerals as in the first embodiment, and description thereof is omitted.

Second Embodiment

Figure 10A:
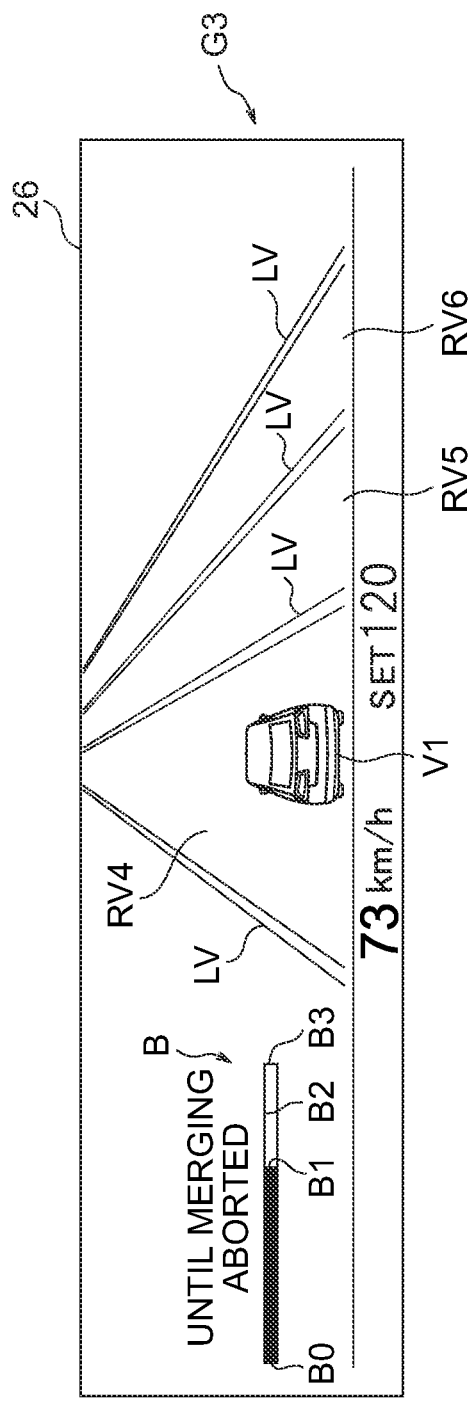
FIG. 10A is a drawing showing an image for merging of the head-up display of a second embodiment.

An image for merging of the HUD 26 in the second embodiment is shown in FIG. 10A. An image for merging of the meter display 24 in the second embodiment is shown in FIG. 10B. In this embodiment, in a case in which the own vehicle 12 attempts to merge from the traveling lane R4 into the merging destination lane R5 during autonomous driving, the information of the first point P1 at which the attempt will be aborted is displayed in the HUD 26 and in the meter display 24 by bar graphs B. Right ends B3 of the respective bar graphs B show the final point P3 of the traveling lane R4. Position B1 that indicates the first point P1, and position B2 that indicates the second point P2, are set in the intermediate portions of the respective bar graphs B. In the bar graphs B, as the own vehicle 12 advances in the traveling lane R4 toward the final point P3 side, a bar-like display extends from left end B0 toward the right end B3. For example, this bar-like display is displayed in white in the segment from B0 to B1, and is displayed in yellow in the segment from B1 to B2, and is displayed in orange in the segment from B2 to B3. In the segment from B0 to B1 that is displayed in white, the attempt to merge in autonomous driving is continued.

In this embodiment, structures other than those described above are similar to those of the first embodiment. In this embodiment as well, the occupant of the own vehicle 12 can, by the bar graphs B, visually comprehend up to when the attempt to merge in autonomous driving will continue. Therefore, the vehicle occupant can easily understand in advance the necessity of intervening in the driving operation.

Third Embodiment

Figure 11A:
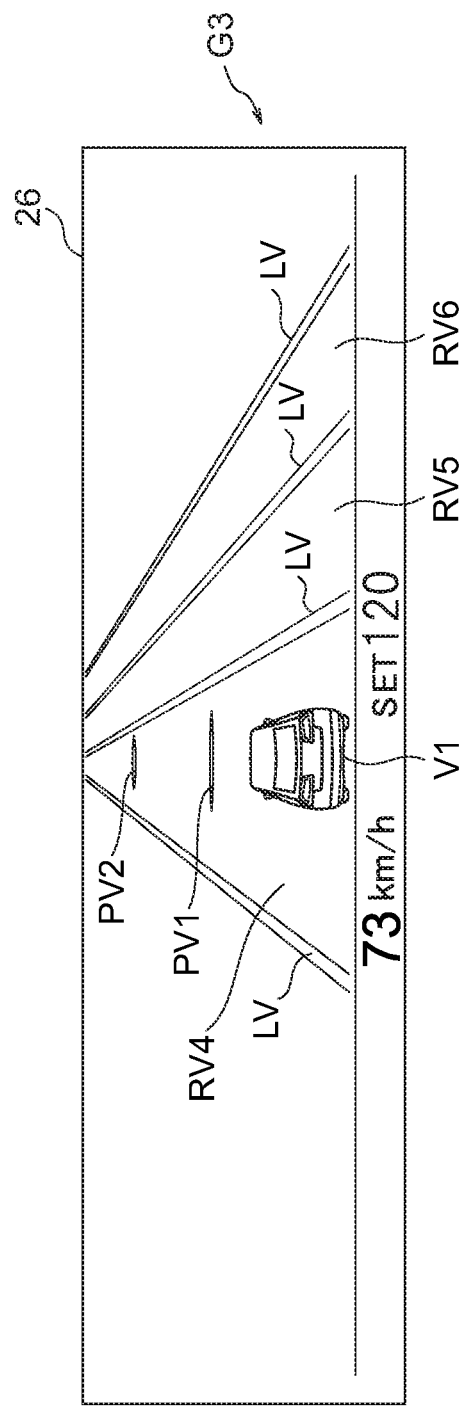
FIG. 11A is a drawing showing an image for merging of the head-up display of a third embodiment.
Figure 11B:
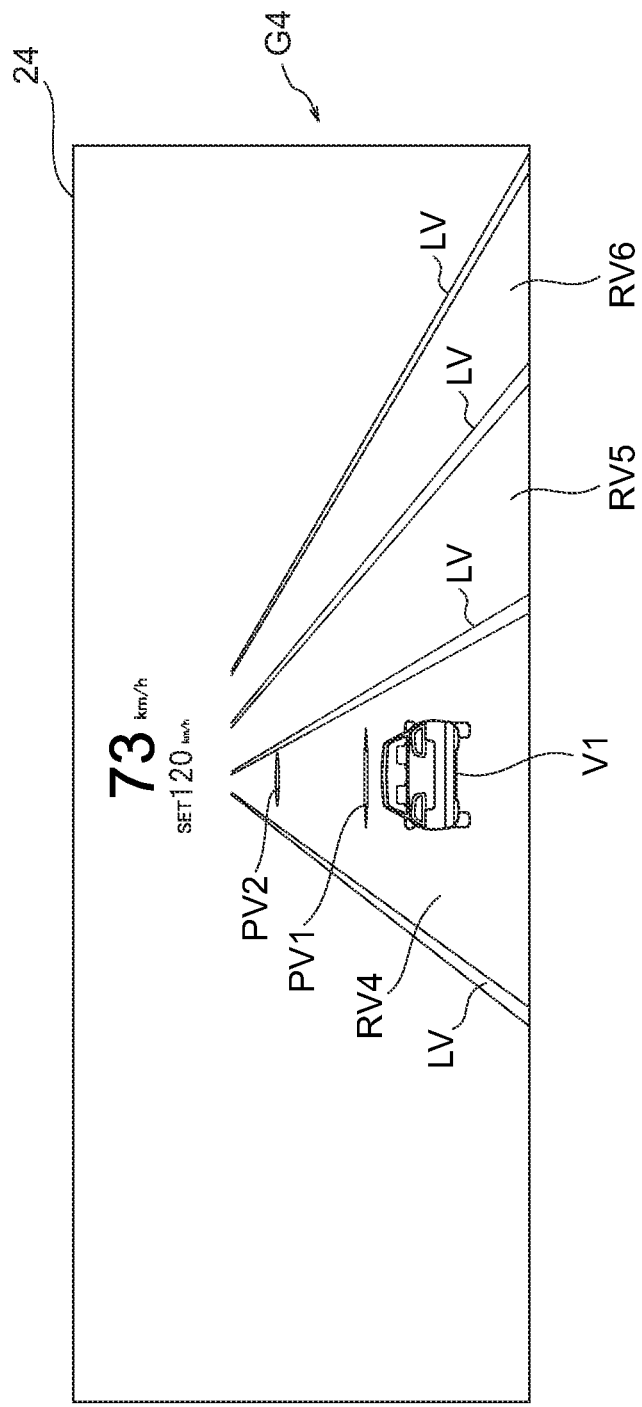
FIG. 11B is a drawing showing an image for merging of the meter display of the third embodiment.

An image for merging of the HUD 26 in the third embodiment is shown in FIG. 11A. An image for merging of the meter display 24 in the third embodiment is shown in FIG. 11B. In this embodiment, in a case in which the own vehicle 12 attempts to merge from the traveling lane R4 into the merging destination lane R5 during autonomous driving, the first point P1 at which the attempt will be aborted, and the second point P2 that is the starting point of the braking segment S2, are displayed on the HUD 26 and the meter display 24 as linear images PV1, PV2.

In this embodiment, structures other than those described above are similar to those of the first embodiment. In this embodiment as well, the occupant of the own vehicle 12 can, by the linear image PV1, visually comprehend up to when the attempt to merge in autonomous driving will continue. Therefore, the vehicle occupant can easily understand in advance the necessity of intervening in the driving operation.

Although the present disclosure has been described above by illustration of several embodiments, the present disclosure can, of course, be implemented in various forms within a scope that does not depart from the gist thereof. For example, in the above-described embodiments, the meter display 24 is provided at the vehicle front side of the driver's seat at the instrument panel 14, but the present disclosure is not limited to this. The meter display 24 may be a center display that is provided at the vehicle transverse direction central portion of the instrument panel 14.

Further, although the above-described embodiments are structured such that the HUD 26, which projects images onto the windshield glass 18 that is the windshield, is included in the display portion, the present disclosure is not limited to this. For example, the display portion may be a portion that can project images onto a projection surface that is other than the windshield.

Note that any of various types of processors other than the CPU 72 may execute the display control processing that is executed by the CPU 72 reading-in software (a program) in the above-described embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the display processing may be executed by one of these various types of processors, or may be executed by a combination of two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Moreover, the above-described respective exemplary embodiments are structured such that various data are stored in the non-volatile storage 76 which is an HDD or an SSD or the like, but the present disclosure is not limited to this. A recording medium such as, for example, a CD (Compact Disk), a DVD (Digital Versatile Disk), a USB (Universal Serial Bus) memory, or the like may be the storage. In this case, the various programs and data and the like are stored on such a recording medium.

What is claimed is:

1. An onboard display control device that is installed in a vehicle configured to enable autonomous driving, the device comprising:
   an information acquisition section that is configured to, in a case in which the vehicle attempts to merge from a traveling lane into a merging destination lane during autonomous driving, acquire information regarding a point at which the attempt will be aborted, before the vehicle arrives at the point; and
   a display control section that is configured to display the point at which the merging attempt will be aborted, before arrival at the point, at a display portion that is provided within a vehicle cabin of the vehicle.

2. The onboard display control device of claim 1, wherein:
   the information acquisition section is configured to acquire information regarding the traveling lane, and
   on the basis of the information acquired by the information acquisition section, the display control section displays, at the display portion, an image in which an image of the traveling lane and an image of the point are combined.

3. The onboard display control device of claim 2, wherein the display control section displays, at the display portion, an image of a fixed segment that is established in the traveling lane and that has the point as a starting point.

4. The onboard display control device of claim 3, wherein the fixed segment includes a driving hand-over request segment in which at least one of steering or acceleration of the vehicle is controlled by the vehicle, and in which an occupant of the vehicle is urged to intervene in driving operation.

5. The onboard display control device of claim 3, wherein the fixed segment includes a braking segment in which the vehicle is automatically stopped in a case in which an occupant of the vehicle does not intervene in driving operation.

6. The onboard display control device of claim 3, wherein the display control section displays the fixed segment as a belt-shaped image at the display portion.

7. The onboard display control device of claim 3, wherein the display control section displays, at the display portion, an image of the fixed segment in forms that differ for a plurality of stages in accordance with a deferment time until the vehicle is stopped automatically in a case in which an occupant of the vehicle does not intervene in driving operation.

8. The onboard display control device of claim 3, wherein the display control section displays, at the display portion, an image of the fixed segment in forms that differ for a plurality of stages in correspondence with a change in control of the autonomous driving that is carried out in a case in which an occupant of the vehicle does not intervene in driving operation.

9. The onboard display control device of claim 1, wherein, in a case in which the vehicle arrives at the point, the display control section displays, at the display portion, a driving hand-over request image for urging an occupant of the vehicle to intervene in driving operation.

10. The onboard display control device of claim 1, wherein the display portion includes a head-up display that displays an image so as to overlap a front view that an occupant of the vehicle sees through a windshield.

11. The onboard display control device of claim 1, wherein the display portion includes a meter display that is provided at an instrument panel of the vehicle.

12. The onboard display control device of claim 1, wherein the display control section displays the vehicle and a periphery thereof at the display portion as an image that models a state in which the vehicle and the periphery thereof are seen from an obliquely rear upper side of the vehicle.

13. An onboard display device that is installed in a vehicle configured to enable autonomous driving, the device comprising:

a display portion that is provided within a vehicle cabin of the vehicle; and the onboard display control device of claim 1.

14. A display control method that is executed by a processor that is installed in a vehicle configured to enable autonomous driving, the method comprising:

in a case in which the vehicle attempts to merge from a traveling lane into a merging destination lane during autonomous driving, acquiring information regarding a point at which the attempt will be aborted, before the vehicle arrives at the point; and displaying the point at which the merging attempt will be aborted, before arrival at the point, at a display portion that is provided within a vehicle cabin of the vehicle.

15. A non-transitory computer readable medium comprising readable code executable by one or more process installed in a vehicle configured to enable autonomous driving, the program comprising:

in a case in which the vehicle attempts to merge from a traveling lane into a merging destination lane during autonomous driving, acquiring information regarding a point at which the attempt will be aborted, before the vehicle arrives at the point; and displaying the point at which the merging attempt will be aborted, before arrival at the point, at a display portion that is provided within a vehicle cabin of the vehicle.

\* \* \* \* \*